UNITED STATES PATENT OFFICE.

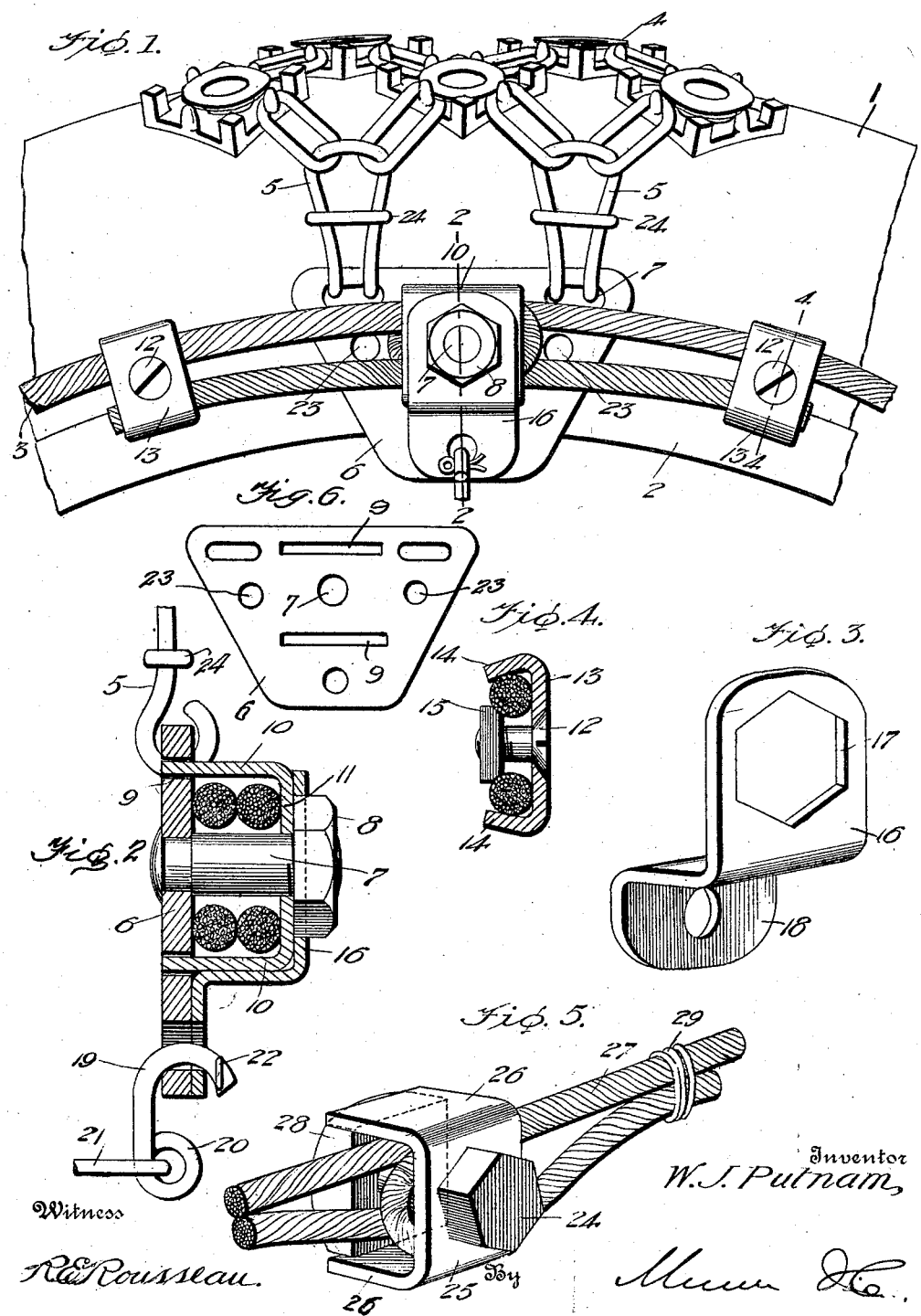

WALTER J. PUTNAM, OF DEPOSIT, NEW YORK.

FASTENING DEVICE.

1,306,277.   Specification of Letters Patent.   Patented June 10, 1919.

Application filed March 14, 1918.   Serial No. 222,342.

*To all whom it may concern:*

Be it known that I, WALTER J. PUTNAM, a citizen of the United States, and a resident of Deposit, in the county of Broome and State of New York, have invented certain new and useful Improvements in Fastening Devices, of which the following is a specification.

My invention is an improvement in fastening devices for connecting the ends of flexible members, as, for instance, the ends of cables used in holding upon a pneumatic tire the tire armor forming the subject matter of my prior Patent No. 1,187,173, dated June 13, 1916.

In the drawings:

Figure 1 is a side view of a portion of the tire armor in place, showing the connecting means for the holding cables;

Fig. 2 is a section on the line 2—2 of Fig. 1;

Fig. 3 is a perspective view of the lock for the nut;

Fig. 4 is a section on the line 4—4 of Fig. 1;

Fig. 5 is a perspective view of another embodiment of the invention, with the cables broken away;

Fig. 6 is a plan view of the plate.

The present embodiment of the invention is shown in connection with a pneumatic tire 1 of usual construction seated upon the usual felly 2, and arranged to connect the ends of a cable 3, which is provided for holding upon the tire the armor 4 forming the subject matter of my prior Patents Nos. 1,187,173 granted June 13, 1916, and 1,259,776, granted March 19, 1918.

This armor, as shown, consists of units which are connected by links, and is provided at its opposite sides with double hooks 5, which are connected with the cable 3, and the holding plate 6 which is a base for the mechanism for connecting the ends of the cable. This base, as shown, is of trapezoidal form, and is arranged with its long side adjacent to the tire armor and with its short side adjacent to the rim. This plate has openings 7 near the ends of its long side, which are adapted for engagement by the bills of the double hooks 5 which are adjacent to the plate, it being understood that the remaining hooks of the tire armor at that side of the wheel engage the cable directly.

This plate 6 has extending laterally therefrom at approximately the center a stem 7 rigidly connected with the plate, the outer end of the stem being threaded for engagement by a nut 8. The plate also has at the opposite sides of the stem slots 9 which are adapted to receive the sides 10 of a keeper, the said keeper consisting of the sides 10 and a body 11. The ends of the cable 3 are adapted to be bent about the stem 7, that is, doubled upon themselves, as shown more particularly in Fig. 1, and each free end of the cable is connected to the body of the cable by the mechanism shown in Fig. 4.

The said mechanism comprises a screw bolt 12 whose head is received in a counterbored opening in a keeper body portion 13 and arms 14. The arms extend at an acute angle with respect to the body. The body of the cable 3 and the end are engaged between the side walls 14 of the keeper and the bolt 12, and a nut 15 is threaded on to the bolt. These arms 14 of the keeper are bent sufficiently far inward and the nut is of such diameter that the cable cannot escape from between the nut and the arm, and the cable is thus clasped tightly to the keeper by the nut.

It will be noticed that the edges of the nut adjacent the cable are beveled to facilitate the arranging of the nut on the bolt. The loops formed at the ends of the cable in this manner are passed over the stem 7, after which the keeper is placed over the loops as shown in Figs. 1 and 2, and the nut 8 is threaded on to the same outside the body of the keeper. The keeper is thus clamped on the loops which are forced down tightly against the plate in such manner that there is no possibility of their displacement.

Preferably, the nut is locked by the lock shown in Fig. 3. This lock consists of a plate 16 having an opening 17 fitting the nut and engaging the same, the plate resting upon the body of the keeper. The plate has a portion 18 which is offset laterally with respect to the portion 16 into engagement with the plate 6, as shown in Fig. 2, and the plate and the lock have registering openings for receiving a hook 19 to hold the lock to the plate. This hook, as shown, has an eye 20 which is engaged by a link 21, and the opposite end of the link 21 is engaged with a similar eye on the hook 19 at the opposite side of the wheel. A cotter pin 22 may be passed through the bill of the hook 19 to secure against accidental displacement of the parts.

In use, the ends of the cable have loops as specified, and they are fitted over the stem 7 after the armor has been placed upon the wheel, and it will be noticed that openings 23 are provided in the plate 6 near its ends for engagement by a tool to facilitate the placing of the parts. After the ends have been looped over the stem, the keeper 10—11 is placed and the nut 8 is screwed up tight; after which the lock is placed and the hooks 19 are engaged with the locks at opposite sides of the wheel. The link 21 extends between the spokes across the rim and in addition to this function of holding the locks in place prevents movement of the armor circumferentially of the wheel.

It will be noticed that each of the double hooks 5 has a loop 24 about the two portions of the hook to prevent spreading of the hook. By means of the connection shown in Fig. 4, wear or stretching of the cable may be compensated for, the elements 13—14 being easily adjustable on the cable.

In Fig. 5 the improvement is shown arranged for any character of connection. In this arrangement a bolt 24 is provided, which is passed through the body 25 of a keeper, consisting of the said body and arms 26 corresponding in all respects to the keeper 10—11 of Figs. 1 and 2. The looped ends of the cable 27 are engaged over the bolt 24 and a nut 28 is threaded on to the bolt, the nut being arranged between the arms of the keeper and locked in this position while the bolt is turned to engage it with the nut. In this construction the ends of the cable are clamped between the nut and the body of the keeper. In both arrangements the looped ends of the cable may be connected in any manner, as, for instance, by the binding 29 of wire or the like.

The arrangement of the ends of the cable, looped and lying one upon the other and then clamped together, provides a very secure connection, that cannot be displaced under ordinary conditions.

I claim:

A clamp for connecting the looped ends of flexible members, consisting of a plate having a lateral stem for engaging within the loops, with the loops in overlapping relation, said plate having slots at opposite sides of the stem; a keeper having an opening for receiving the stem and engaging over the loops and engaging with its ends the slots to prevent swinging of the keeper and to prevent spreading of the ends of the keeper; a nut threaded on the stem outside of the keeper, and means for locking the nut.

WALTER J. PUTNAM.

Copies of this patent may be obtained for five cents each, by addressing the "Commissioner of Patents, Washington, D. C."